(12) United States Patent
Brennan

(10) Patent No.: US 7,922,982 B1
(45) Date of Patent: Apr. 12, 2011

(54) CHEMICAL DISPENSING SYSTEMS

(76) Inventor: Joseph J. Brennan, Phoenix, AZ (US)

( * ) Notice: Subject to any disclaimer, the term of this patent is extended or adjusted under 35 U.S.C. 154(b) by 712 days.

(21) Appl. No.: 11/692,142

(22) Filed: Mar. 27, 2007

Related U.S. Application Data

(60) Provisional application No. 60/743,824, filed on Mar. 27, 2006.

(51) Int. Cl.
*C02F 1/68* (2006.01)
(52) U.S. Cl. .................. 422/265; 210/167.11; 210/242.1
(58) Field of Classification Search .................. 422/265; 210/167.11, 242.1
See application file for complete search history.

(56) References Cited

U.S. PATENT DOCUMENTS

| | | | |
|---|---|---|---|
| 3,792,979 A | 2/1974 | Clinton | |
| 4,241,025 A | 12/1980 | Grayson, IV et al. | |
| 4,473,533 A | 9/1984 | Davey | |
| 4,606,893 A | 8/1986 | Sangster | |
| 4,630,634 A | 12/1986 | Sasaki et al. | |
| 4,643,881 A | 2/1987 | Alexander et al. | |
| 4,702,270 A | 10/1987 | King, Sr. | |
| 4,763,685 A | 8/1988 | King, Sr. | |
| 4,781,897 A | 11/1988 | Geron et al. | |
| 4,822,571 A | 4/1989 | Nicholson et al. | |
| 4,825,528 A | 5/1989 | Nicholson et al. | |
| 4,828,803 A | 5/1989 | Nicholson et al. | |
| 4,828,804 A | 5/1989 | Nicholson et al. | |
| 4,917,868 A * | 4/1990 | Alexander et al. | 422/119 |
| 4,998,228 A * | 3/1991 | Eger et al. | 368/10 |
| 5,055,183 A | 10/1991 | Buchan | |
| 5,059,316 A | 10/1991 | Renton | |
| 5,064,624 A | 11/1991 | King | |
| 5,072,849 A | 12/1991 | Blau | |
| 5,137,731 A | 8/1992 | Casberg | |
| 5,407,567 A * | 4/1995 | Newhard | 210/198.1 |
| 5,476,116 A | 12/1995 | Price et al. | |
| 5,911,542 A * | 6/1999 | Obrock et al. | 405/219 |
| 6,123,842 A | 9/2000 | Buchan | |
| 6,238,553 B1 | 5/2001 | Lin | |
| 6,432,371 B1 | 8/2002 | Oliver, Jr. | |
| 6,582,668 B2 | 6/2003 | Green | |
| 6,641,787 B1 | 11/2003 | Siggins et al. | |
| 6,676,908 B2 * | 1/2004 | Robinson et al. | 422/265 |
| 6,730,509 B2 | 5/2004 | VanErdewyk | |
| 6,855,300 B2 | 2/2005 | Cormier | |
| 2004/0246703 A1 | 12/2004 | Adams | |

FOREIGN PATENT DOCUMENTS

EP 0382860 A1 8/1990

* cited by examiner

*Primary Examiner* — Walter D Griffin
*Assistant Examiner* — Christopher K VanDeusen
(74) *Attorney, Agent, or Firm* — Parsons & Goltry; Michael W. Goltry; Robert A. Parsons

(57) ABSTRACT

A chemical dispensing system for a water-filled structure, such as, for example, a swimming pool or a spa, having an interchangeable float adjuster.

6 Claims, 7 Drawing Sheets

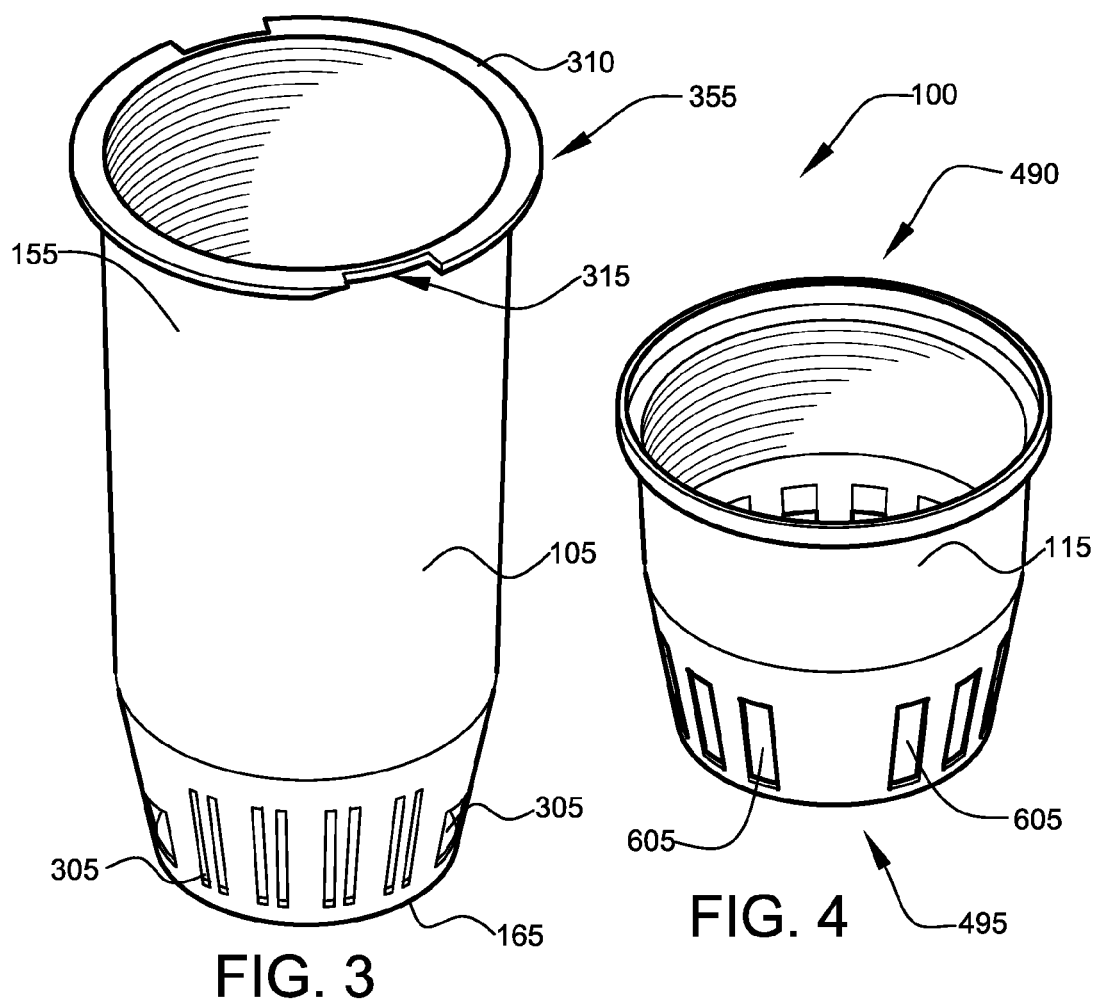
FIG. 3
FIG. 4
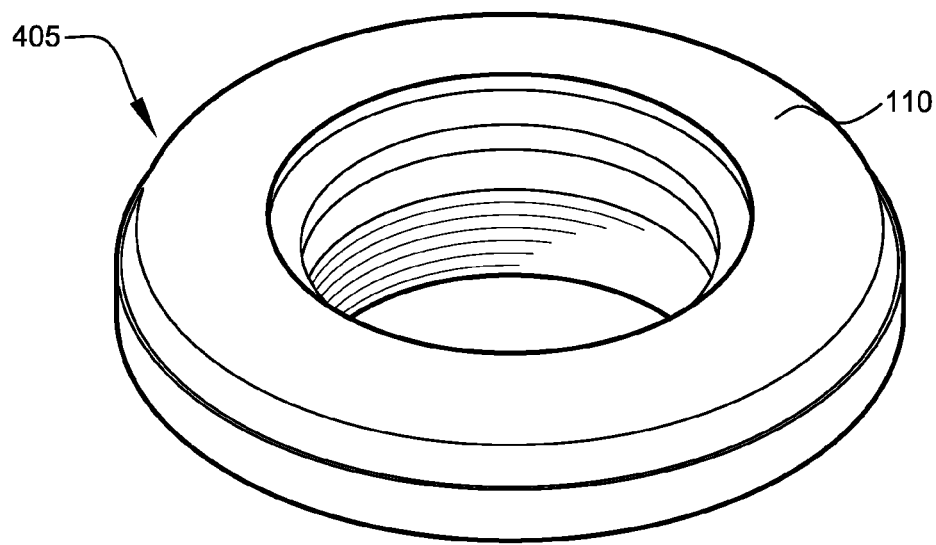
FIG. 5

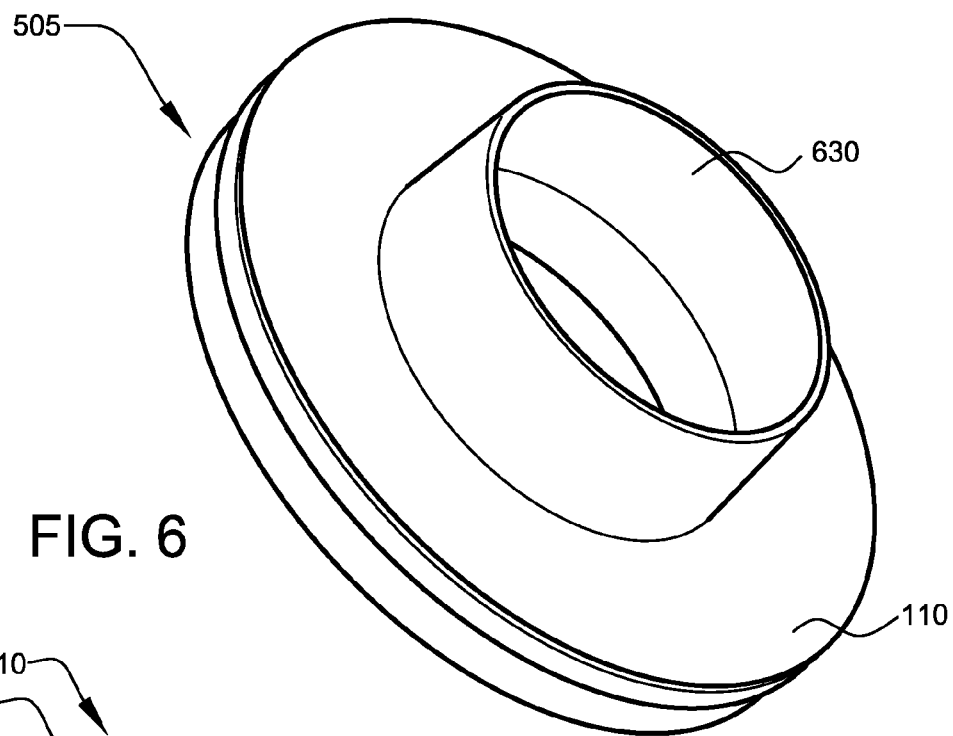
FIG. 6
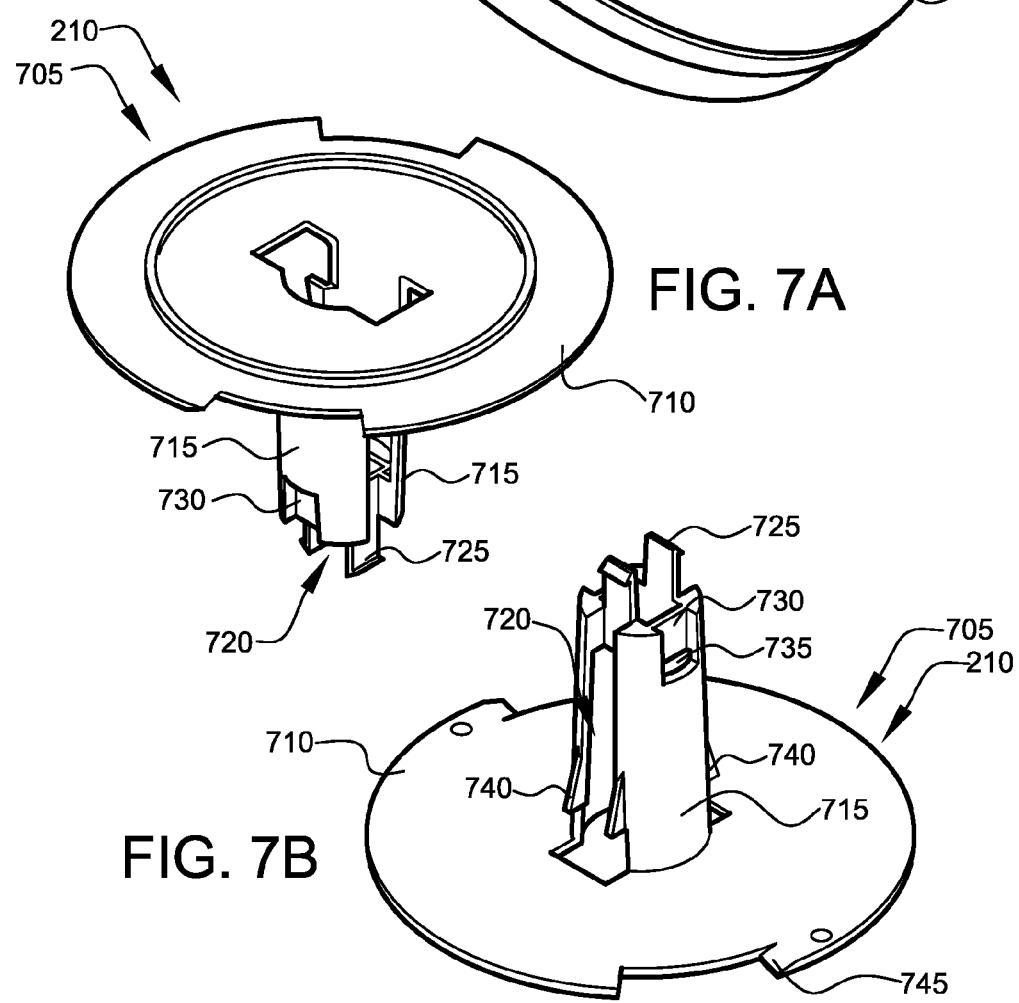
FIG. 7A
FIG. 7B

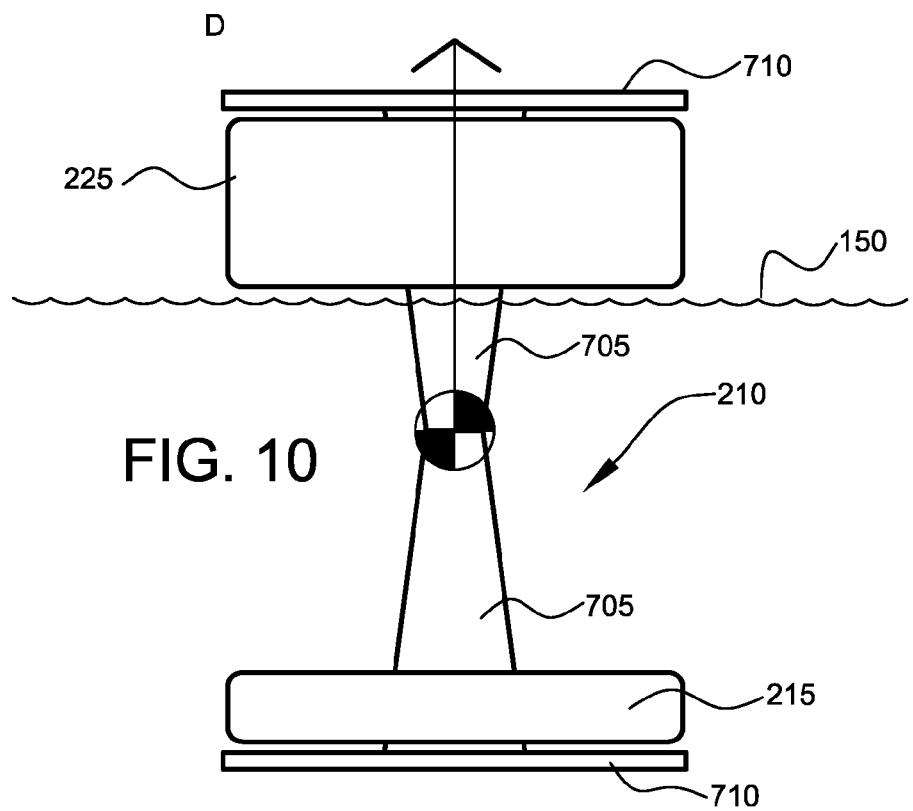
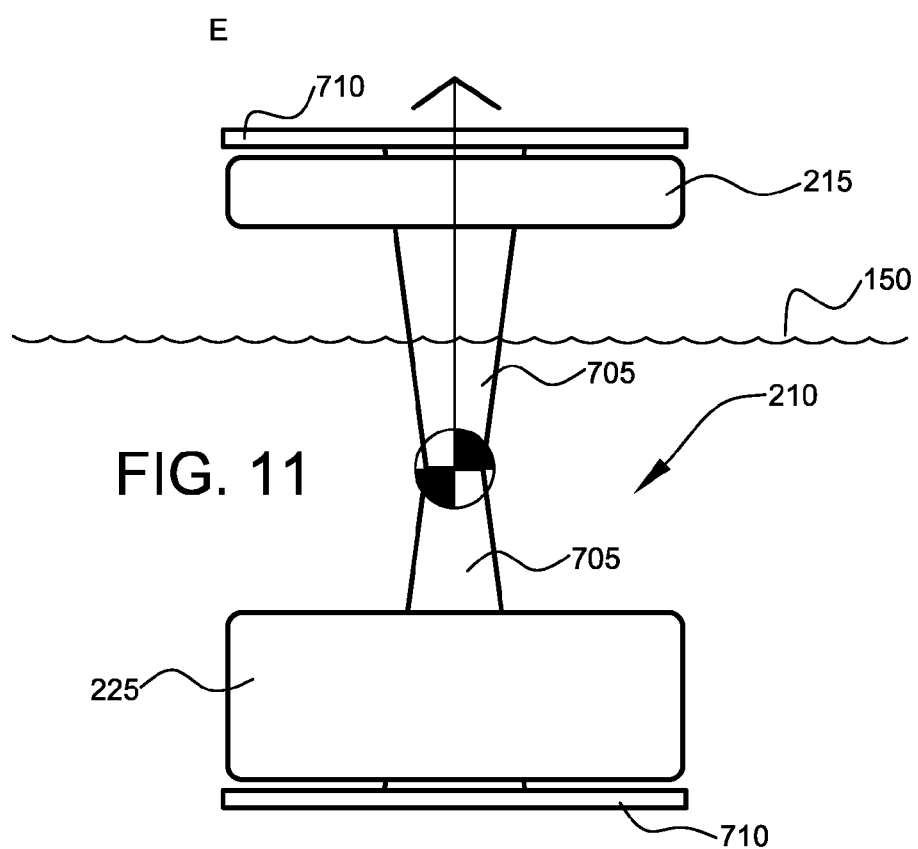

CHEMICAL DISPENSING SYSTEMS

CROSS-REFERENCE TO RELATED APPLICATION

The present application is related to and claims priority from prior provisional application Ser. No. 60/743,824, filed Mar. 27, 2006, entitled "Chemical Dispensing Systems", the contents of which is incorporated herein by this reference and is not admitted to be prior art with respect to the present invention by the mention in this cross-reference section.

BACKGROUND

This invention relates to chemical dispensing systems. More particularly, this invention relates to chemical dispensing systems wherein such chemical dispensing systems float in water-filled structures, such as, for example, swimming pools or spas, and wherein such chemical dispensing systems comprise chemical depletion indicators.

Typically, water contained within swimming pools or spas must be treated with chemicals to keep the water in such swimming pools or spas acceptable for human recreational use. To effectively treat water in such swimming pools or spas, the concentration of dispensed chemical must be effectively monitored and replaced accordingly.

Therefore, a need exists for systems that dispense chemicals in water-filled structures, such as, for example, pools or spas. Further, a need exists for such systems that visibly indicate to users that such chemicals are depleted and need replacing. Further, a need exists for such systems that may be adjusted to preserve visual indication of chemical depletion while accounting for different needs of a user.

OBJECTS AND FEATURES OF THE INVENTION

It is a primary object and feature of the present invention to provide a system to overcome the above-described problems.

It is a further object and feature of the present invention to provide chemical dispensing system. A further object and feature of the present invention is to provide such a system for use with water-filled structures, such as, for example, swimming pools or spas. A further object and feature of the present invention is to provide such a system that gives an accurate indication of chemical depletion depending on the condition of the water and the needs of the user. A further object and feature of the present invention is to provide such a system comprising a float adjuster to accurately monitor the dispensation of a chemical in water-filled structures.

It is a further object and feature of the present invention to provide such a system that provides a visual indicator to communicate chemical depletion to a user.

It is a further object and feature of the present invention to provide such a system that provides an adjustable member for setting, adjusting, and readjusting the rate of chemical dispersal.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a chemical dispensing system relating to dispensing at least one at least partially-soluble chemical into at least one water-filled structure, such chemical dispensing system comprising: at least one holder structured and arranged to hold at least one of at least two user-selected amounts of at least one at least partially-soluble chemical; wherein such at least one holder comprises at least one holder aperture structured and arranged to provide water entry into such at least one holder and chemical exit from such at least one holder, and at least one float-assister removably inserted into such at least one holder; wherein such at least one float assister is structured and arranged to assist flotation of such at least one holder at least partially above at least one water surface; and at least one float adjuster comprising such at least one float-assister; wherein such at least one float adjuster is structured and arranged to adjust such at least one float-assister relative to any of such at least two user-selected amounts of such at least one at least partially-soluble chemical; at least one chemical-depletion indicator structured and arranged to visually indicate above such at least one water surface to at least one user chemical-depletion of such at least one at least partially-soluble chemical; wherein such at least one float-adjuster is structured and arranged to compensate for such selection of such at least one of such at least two user-selected amounts of at least one at least partially-soluble chemical so as to preserve similar such visual indication when any of such at least two user-selected amounts may be used. Moreover, it provides such a chemical dispensing system wherein such at least one float adjuster is removably insertable into such at least one holder. Additionally, it provides such a chemical dispensing system wherein such at least one float-adjuster comprises at least one first float and at least one second float; such at least one first float is structured and arranged to displace at least one first volume of water; such at least one second float is structured and arranged to displace at least one second volume of water; and such at least one float adjuster comprises at least one user-selectable geometry structured and arranged so that either such at least one first float or such at least one second float is submerged under such at least one water surface when such at least one user-selectable geometry is inserted into such at least one holder. Also, it provides such a chemical dispensing system wherein such at least one first float comprises closed-cell foam. In addition, it provides such a chemical dispensing system wherein such at least one second float comprises closed-cell foam. And, it provides such a chemical dispensing system wherein such at least one float adjuster comprises at least one water-fillable chamber; and such at least one first float and such at least one second float are positioned opposite each other and surrounding such at least one water-fillable chamber. Further, it provides such a chemical dispensing system wherein such chemical dispensing system further comprises at least one chemical-exit regulator structured and arranged to regulate at least one exit rate of such at least one of such at least two user-selected amounts of at least one at least partially-soluble chemical. Even further, it provides such a chemical dispensing system wherein such at least one holder comprises at least one holder upper end and at least one holder lower end; such at least one chemical-exit regulator comprises at least one rotatable cover rotatably coupled to such at least one lower end; wherein such at least one rotatable cover comprises at least one rotatable-cover aperture substantially complementary to such at least one holder aperture; wherein a user may selectively rotate such at least one rotatable cover to a user-desired position; wherein the alignment of such at least one holder aperture and such at least one rotatable cover aperture is structured and arranged to regulate such at least one exit rate of such at least one of such at least two user-selected amounts of at least one at least partially-soluble chemical from such at least one holder. Moreover, it provides such a chemical dispensing system further comprising at least one upright restricter structured and arranged to restrict such at least one holder to a substantially upright position. Additionally, it provides such a chemical dispensing system wherein: such at least one upright restricter comprises at least one floatable toroidal member; and such at least one holder may be nestably supported within such at least one floatable toroidal member. Also, it provides such a chemical dispensing system wherein: such at least one upright restricter comprises at least one upright-restricter-top portion and at least one upright-restricter-bottom portion; prior to chemical depletion, such at least one holder upper end is substantially flush with such at least one upright-restricter-top portion. In addition, it provides such a chemical dispensing system wherein such at least one chemical-depletion indicator indicates chemical depletion when such at least one chemical depletion indicator protrudes above such at least one upright-restricter-top portion. And, it provides such a chemical dispensing system wherein: such at least one holder comprises at least one exterior; and such at least one chemical-depletion indicator comprises at least one first color encircling such at least one exterior; wherein such at least one band of color is visible when such at least one chemical depletion indicator protrudes above such at least one upright-restricter-top portion. Further, it provides such a chemical dispensing system wherein such at least one upright restricter comprises at least one second color; and wherein such chemical depletion indicator indicates chemical depletion by at least one visible color difference. Even further, it provides such a chemical dispensing system further comprising at least one cap structured and arranged to cap such at least one float adjuster; wherein such at least one cap is securely attached to such at least float adjuster. Moreover, it provides such a chemical dispensing system wherein such at least one cap is securely attached to such at least one holder. Additionally, it provides such a chemical dispensing system wherein such chemical-depletion indicator performs such visual indication prior to complete depletion of any of such at least two user-selected amounts of such at least one at least partially-soluble chemical.

In accordance with another preferred embodiment hereof, this invention provides a chemical dispensing system relating to dispensing at least one at least partially-soluble chemical into at least one water-filled structure, such chemical dispensing system comprising at least one holder structured and arranged to hold at least one of at least two user-selected amounts of at least one at least partially-soluble chemical; wherein such at least one holder comprises at least one holder aperture structured and arranged to provide water entry into such at least one holder and at least one of at least two user-selected amounts of at least one at least partially-soluble chemical exit from such at least one holder, and at least one float-assister structured and arranged to assist flotation of such at least one holder at least partially above at least one water surface; and at least one upright restricter structured and arranged to restrict such at least one holder to a substantially upright position; wherein such at least one upright restricter comprises at least one floatable toroidal member; and wherein such at least one holder may be nestably supported within such at least one floatable toroidal member; wherein chemical depletion is indicated to at least one user when such at least one holder protrudes substantially above such at least one upright restricter.

In accordance with another preferred embodiment hereof, this invention provides a method, relating to dispensing at least one of at least two user-selected amounts of at least one at least partially-soluble chemical into a water-filled structure, such method comprising the steps of: providing at least one chemical dispensing system comprising at least one holder structured and arranged to hold at least one of at least two user-selected amounts of at least one at least partially-soluble chemical; wherein such at least one holder comprises at least one holder aperture structured and arranged to provide water entry into such at least one holder and chemical exit from such at least one holder, and at least one float-assister removably inserted into such at least one holder; wherein such at least one float assister is structured and arranged to assist flotation of such at least one holder at least partially above at least one water surface; and at least one float adjuster comprising such at least one float-assister; wherein such at least one float adjuster is structured and arranged to adjust such at least one float-assister relative to any of such at least two user-selected amounts of such at least one at least partially-soluble chemical; at least one chemical-depletion indicator structured and arranged to visually indicate above such at least one water surface to at least one user chemical-depletion of such at least one at least partially-soluble chemical; wherein such at least one float-adjuster is structured and arranged to compensate for such selection of such at least one of such at least two user-selected amounts of at least one at least partially-soluble chemical so as to preserve similar such visual indication when any of such at least two user-selected amounts may be used; placing such at least one user selected amount of such at least one at least partially-soluble chemical within such holder; selecting between such at least one user selected geometry of such at least one float-adjuster to use in at least one low-microorganism growth period and at least one user selected geometry in at least one high microorganism growth period; placing such at least one chemical dispensing system in such at least one water-filled structure; viewing such at least one chemical depletion indicator; and replacing such at least one at least partially-soluble chemical within such at least one holder. Also, it provides such a method further comprising the step of selecting an opposite user selected geometry of such at least one float-adjuster; setting such at least one chemical-exit regulator to at least one user-desired setting; placing such at least one chemical dispensing system in such at least one water-filled structure; viewing such at least one chemical depletion indicator; and replacing such at least one at least partially-soluble chemical within such at least one holder.

In accordance with another preferred embodiment hereof, this invention provides a chemical dispensing system comprising holder means for holding at least one of at least two user-selected amounts of at least one at least partially-soluble chemical; wherein such holder means comprises water entry means for water entry into such holder means, chemical exit means for chemical exit from such holder means; removably insertable float-assister means for assisting flotation of such holder means at least partially above at least one water surface; wherein such removably insertable float-assister means comprises float adjuster means for adjusting removably insertable float-assister means relative to any of such at least two user-selected amounts of such at least one at least partially-soluble chemical; chemical-depletion indicator means for indicating depletion of such at least one at least partially-soluble chemical to at least one user; wherein such float adjuster means compensate for such selection of such at least one of such at least two user-selected amounts of at least one at least partially-soluble chemical so as to preserve similar such visual indication when any of such at least two user-selected amounts may be used. In addition, it provides such a chemical dispensing system wherein such at least one float adjuster means are removably insertable into such holder means. And, it provides such a chemical dispensing system wherein such float-adjuster means comprises at least one first float and at least one second float; such at least one first float comprises water-displacement means for displacing at least one first volume of water; such at least one second float comprises water-displacement means for displacing at least one second volume of water; and such float adjuster means comprises at least one user-selectable geometry structured and arranged so that either such at least one first float or such at least one second float is submerged under such at least one water surface when such at least one user-selectable geometry is inserted into such holder means. Further, it provides such a chemical dispensing system wherein such chemical dispensing system further comprises chemical-exit regulator means for regulating at least one exit rate of such at least one of such at least two user-selected amounts of at least one at least partially-soluble chemical. Even further, it provides such a chemical dispensing system further comprising upright restricter means for restricting such holder means to a substantially upright position. Even further, it provides such a chemical dispensing system wherein such chemical-depletion indicator means comprises signaling means for signaling chemical depletion to such at least one user. Even further, it provides such a chemical dispensing system wherein such signaling means comprises at least one color. Even further, it provides such a chemical dispensing system further comprising cap means for capping such float adjuster means; wherein such cap means is securely attached to such float adjuster means. Even further, it provides such a chemical dispensing system wherein such cap means is securely attached to such holder means. Even further, it provides such a chemical dispensing system wherein such chemical-depletion indicator means performs such visual indication prior to complete depletion of any of such at least two user-selected amounts of such at least one at least partially-soluble chemical.

In accordance with another preferred embodiment hereof, this invention provides a chemical dispensing system relating to dispensing at least one at least partially-soluble chemical into at least one water-filled structure, such chemical dispensing system comprising holder means for holding at least one of at least two user-selected amounts of at least one at least partially-soluble chemical; wherein such holder means comprises water entry means for water entry into such holder means and chemical exit means for chemical exit from such holder means; float-assister means for assisting flotation of such holder means at least partially above at least one water surface; and upright restricter means for restricting such holder means to a substantially upright position; wherein such upright restricter means comprises at least one floatable toroidal member; and wherein such holder means may be nestably supported within such at least one floatable toroidal member; wherein chemical depletion is indicated to at least one user when such holder means protrudes substantially above such upright restricter means.

BRIEF DESCRIPTION OF THE DRAWINGS

FIG. 3 shows a perspective view illustrating a body of the chemical dispensing system according to the preferred embodiment of FIG. 1A.

FIG. 4 shows a perspective view illustrating a shutter of the chemical dispensing system according to the preferred embodiment of FIG. 1A.

FIG. 5 shows a perspective view illustrating a top portion of a float ring of the chemical dispensing system according to the preferred embodiment of FIG. 1A.

FIG. 6 shows a close-up perspective view illustrating a bottom portion of the float ring of the chemical dispensing system according to the preferred embodiment of FIG. 1A.

FIG. 7A shows a perspective view illustrating a foam holder assembly of a float adjuster of the chemical dispensing system according to the preferred embodiment of FIG. 1A.

FIG. 7B shows an inverted perspective view illustrating the foam holder assembly of FIG. 7A.

FIG. 10 shows a diagrammatic representation illustrating a float adjuster of the chemical dispensing system according to the preferred embodiment of FIG. 1A with a small foam float at a bottom end.

FIG. 11 shows a diagrammatic representation illustrating the float adjuster of the chemical dispensing system according to the preferred embodiment of FIG. 1A having a large foam float at the bottom end.

DETAILED DESCRIPTION OF THE BEST MODES AND PREFERRED EMBODIMENTS OF THE INVENTION

Water-filled structures, such as, for example, swimming pools and spas (hereinafter sometimes referred to as water-filled structures), are used by humans for recreation. It is necessary to chemically treat water in water-filled structures to keep the water clear and sparkling as well as to prevent the growth of microorganisms, such as, for example, algae and/or bacteria. Chlorine is a typical chemical commonly used to treat water-filled structures. Typically chlorine tablets are placed in water-filled structures to treat the water. The chemical dispensing system of this invention holds chemicals, such as, for example, chlorine, to destroy microorganisms in the water of water-filled structures and to keep such water clear and sparkling.

Generally, during winter seasons, less chemical is needed to treat water-filled structures due to reduced microorganism growth, less frequent use of such water-filled structure, etc. Placing unnecessary amounts of chemical into water-filled structures during winter seasons may be wasteful. During summer seasons, more chemical is needed to treat water-filled structures due to increased microorganism growth, and more frequent use of such water-filled structure. To effectively monitor the amount of chemical in water-filled structures, and to determine when such chemical needs to be replaced, the performance of the chemical dispensing system must be consistent regardless of the amount of chemical added to the system so that a user may react appropriately. This invention provides a single system for use in multiple microorganism-growth conditions, such as, for example, summer and winter seasons, comprising a float adjuster to compensate for differences in the amount of a chemical needed to effectively treat a water-filled structure, wherein such float adjuster is placed within such water-filled structure to notify a user of the proper time to replace such chemical.

Figure 1A:
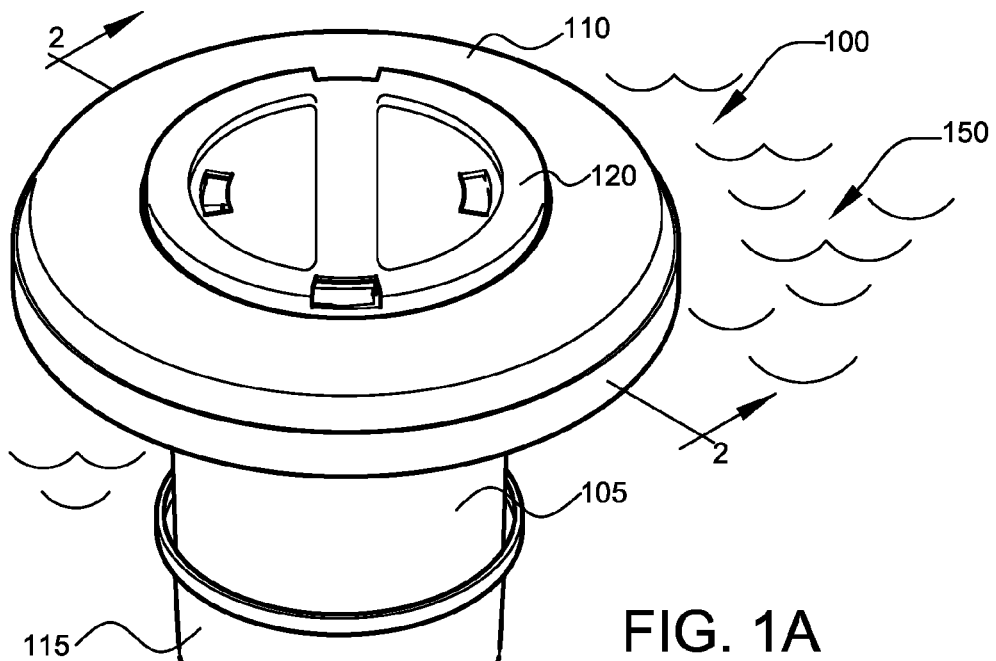
FIG. 1A shows a perspective view illustrating a chemical dispensing system (illustrating such system in use and in a "full" or "nearly full" condition) according to a preferred embodiment of the present invention.
Figure 1B:
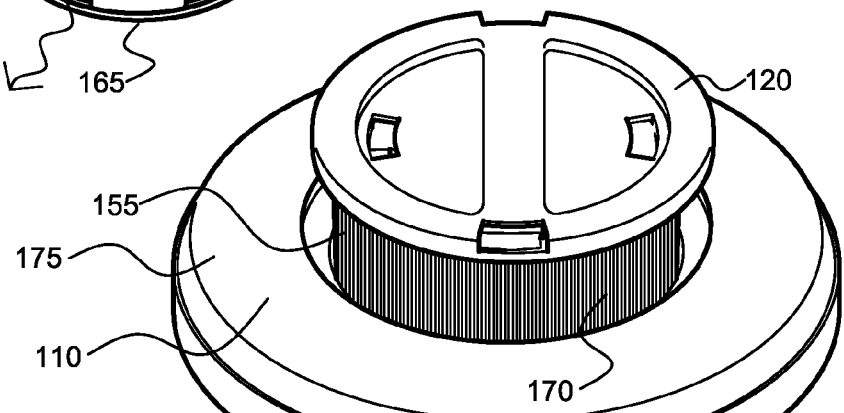
FIG. 1B shows a perspective view illustrating the chemical dispensing system (illustrating such system in use and in a "depleted" or "nearly depleted" condition) according to the preferred embodiment of FIG. 1A.

FIGS. 1A and 1B show perspective views illustrating chemical dispensing system 100 according to a preferred embodiment of the present invention. Preferably, chemical dispensing system 100 comprises body 105, float ring 110, shutter 115, and cap 120, all as shown.

Figure 2:
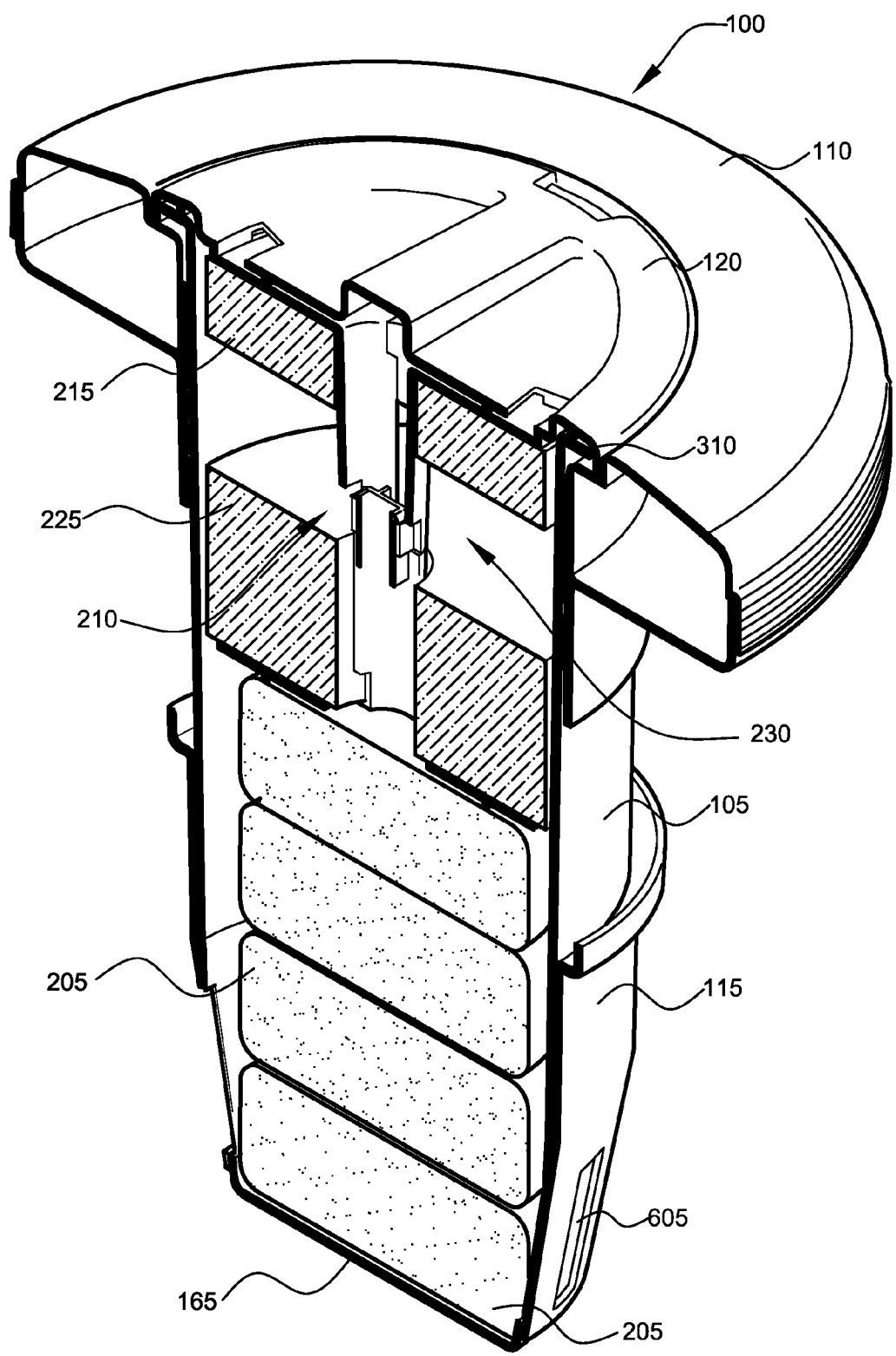
FIG. 2 shows a close-up perspective cross-sectional view through the section 2-2 of FIG. 1A.

When placed in water 150, chemical dispensing system 100 floats, as shown. Preferably, body 105 is buoyant, as shown, and is kept from tipping by being disposed within float ring 110, as shown. Preferably, small foam float 215 and large foam float 225 render body 105 buoyant, as shown in FIG. 2. Preferably, chemical dispensing system 100 may float freely in water, as shown. Upon reading the teachings of this specification, those of ordinary skill in the art will no understand that, under appropriate circumstances, considering such issues as intended use, cost, materials available, engineering considerations, etc., other arrangements for providing buoyancy, such as, for example, air, liquid, etc., may suffice.

Preferably, body 105 is nested within float ring 110, as shown. Preferably, body 105 is kept substantially upright by float ring 110, as shown. Preferably, body 105 is restricted to float ring 110, as shown. Preferably, body 105 is nested within float ring 110 such that body 105 may rise relative to float ring 110, as shown. Preferably, body 105 comprises indicator 155, as shown. Preferably, when an amount of chemical (discussed further with respect to FIG. 2) within chemical dispensing system 100 (preferably within body 105) dissolves in water 150, indicator 155 is visible to a user above float ring 110 as body 105 becomes more buoyant, as shown in FIG. 1B. Preferably, indicator 155 is visible from a substantial distance, such as, for example, from at least the edge of a water-filled structure. Preferably, body 105 comprises color 170, as shown, with white being a preferred color. Preferably, float ring 110 comprises color 175, as shown, with blue being a preferred color. Preferably, indicator 155 comprises at least one color 170, as shown. Preferably, color 170 is arranged in a band encircling body 105, as shown. Upon reading the teachings of this specification, those of ordinary skill in the art will now understand that, under appropriate circumstances, considering such issues as intended use, cost, visibility issues, etc., other arrangements of an indicator, such as, for example, multiple indicator lines for indicating multiple levels of chemical depletion, increasing or decreasing indicator line visible intensity, color changes, pattern changes, LED lights, etc., may suffice.

FIG. 2 shows a close-up perspective cross-sectional view through the section 2-2 of FIG. 1A. FIG. 2 shows chemical tablets 205 (preferably comprising chlorine) disposed within the interior of body 105. Preferably, chemical tablets 205 comprise at least one partially-soluble chemical. Upon reading the teachings of this specification, those having ordinary skill in the art will now understand that, under appropriate circumstances, considering such factors as cost, designs available, new materials then available, dissolving rates, etc., other chemical forms besides tablets, such as, for example, granules, powders, pellets, etc., may suffice.

Preferably, body 105 comprises float adjuster 210, as shown. Preferably, body 105 slightly tapers to bottom 165, as shown.

Preferably, float adjuster 210 is housed within body 105 above chemical tablets 205, as shown. Preferably, float adjuster 210 is removably inserted into body 105 and comprises floats (small foam float 215 and large foam float 225), (such arrangement at least embodying herein at least one float-assister removably inserted into such at least one holder wherein such at least one float assister is structured and arranged to assist flotation of such at least one holder at least partially above at least one water surface) as shown. Preferably, float adjuster 210 (at least embodying herein at least one float adjuster) comprises small foam float 215 and large foam float 225 (such arrangement at least embodying herein at least one float adjuster comprising such at least one float-assister), as shown. Preferably, small foam float 215 (at least embodying herein at least one first float and at least one second float) and large foam float 225 (at least embodying herein at least one first float and at least one second float) are opposite one another surrounding water-fillable chamber 230 (at least embodying herein wherein such at least one float adjuster comprises at least one water-fillable chamber and such arrangement at least embodying herein wherein such at least one first float and such at least one second float are positioned opposite each other and surrounding such at least one water-fillable chamber), as shown. Preferably, small foam float 215 will displace a volume of water (at least embodying herein wherein such at least one first float is structured and arranged to displace at least one first volume of water) and large foam float 225 will displace a different volume of water (at least embodying herein wherein such at least one second float is structured and arranged to displace at least one second volume of water) (depending on which float is inserted into a bottom end of body 105) (such arrangement at least embodying herein wherein such at least one float adjuster comprises at least one user-selectable geometry structured and arranged so that either such at least one first float or such at least one second float is submerged under such at least one water surface when such at least one user-selectable geometry is inserted into such at least one holder). Preferably, both small foam float 215 and large foam float 225 comprise closed-cell foam (at least embodying herein wherein at least one first float comprises closed-cell foam and at least embodying herein wherein such at least one second float comprises closed-cell foam). Upon reading the teachings of this specification, those of ordinary skill in the art will now understand that, under appropriate circumstances, considering such issues as cost, design issues, etc., other configurations of float adjuster, such as, for example, a single foam piece on one side of float adjuster, an hourglass shaped foam piece, etc., may suffice.

FIG. 3 shows a perspective view illustrating body 105 of chemical dispensing system 100 according to the preferred embodiment of FIG. 1A. Preferably, body 105 comprises apertures 305, as shown, to permit entry of water 150 into body 105 and exit of dissolved chemical from body 105, as shown in FIG. 1A. Preferably, body 105 comprises flange 310, as shown. Preferably, body 105 comprises space 315, as shown. Preferably, space 315 and flange 310 assist cap 120 installation. Preferably, body 105 comprises top portion 355, as shown.

FIG. 4 shows a perspective view illustrating shutter 115 of chemical dispensing system 100. Shutter 115 comprises, as shown in this application, at least one chemical-exit regulator structured and arranged to regulate at least one exit rate of such at least one of such at least two user-selected amounts of at least one at least partially-soluble chemical (at least embodying herein at least one chemical-exit regulator structured and arranged to regulate at least one exit rate of such at least one of such at least two user-selected amounts of at least one at least partially-soluble chemical). Preferably, shutter 115 comprises an inverted-cuplike structure with open top 490 and open bottom 495, as shown. Preferably, shutter 115 slips onto and over body 105, as shown. Preferably, shutter 115 comprises shutter-slits 605 (at least embodying herein at least one rotatable-cover aperture), as shown. Preferably, when shutter 115 is slipped over body 105, shutter 115 may rotate around body 105 (such arrangement at least embodying herein wherein such at least one chemical-exit regulator comprises at least one rotatable cover rotatably coupled to such at least one lower end).

Preferably, shutter-slits 605 may overlap, partially overlap, or completely cover apertures 305 (at least embodying herein at least one holder aperture structured and arranged to provide water entry into such at least one holder and chemical exit from such at least one holder) (such arrangement at least embodying herein wherein such at least one rotatable cover comprises at least one rotatable-cover aperture substantially complementary to such at least one holder aperture by rotating shutter 115 relative to body 105 to regulate the rate of chemical dispersal (such arrangement at least embodying herein wherein a user may selectively rotate such at least one rotatable cover to a user-desired position; wherein the alignment of such at least one holder aperture and such at least one rotatable cover aperture is structured and arranged to regulate such at least one exit rate of such at least one of such at least two user-selected amounts of at least one at least partially-soluble chemical from such at least one holder). Upon reading the teachings of this specification, those of ordinary skill in the art will now understand that, under appropriate circumstances, considering such issues as intended use, desired flow of chemical, etc., then available technology, other arrangements of chemical dispersal, such as, for example, pores, electronically controlled shutters, etc., may suffice.

FIG. 5 shows a perspective view illustrating float-ring top 405 of float ring 110 of chemical dispensing system 100 according to the preferred embodiment of FIG. 1A. Preferably, float-ring top 405 comprises a toroidal shape, as shown.

FIG. 6 shows a close-up perspective view illustrating float-ring bottom 505 of float ring 110 of chemical dispensing system 100 according to the preferred embodiment of FIG. 1A. Preferably, float ring 110 comprises float-ring top 405 and float-ring bottom 505, as shown assembled in FIG. 2. Preferably, float-ring bottom 505 has a toroidal shape, as shown. Preferably, float ring 110 has a toroidal shape (at least embodying herein wherein such at least one upright restricter comprises at least one floatable toroidal member), as shown. Preferably, float-ring bottom 505 comprises protrusion 630 which, when float ring 110 is installed on body, extends along a portion of body 105 (as shown, for example, in FIG. 1A) (such arrangement at least embodying herein at least one upright restricter structured and arranged to restrict such at least one holder to a substantially upright position), as shown.

FIG. 7A shows a perspective view illustrating foam holder assembly 705 of float adjuster 210 of chemical dispensing system 100 according to the preferred embodiment of FIG. 1A.

FIG. 7B shows an inverted perspective view illustrating foam holder assembly 705 of FIG. 7A.

Preferably, float adjuster 210 comprises two foam holder assemblies 705 coupled together, as shown in FIG. 2. Preferably, each foam holder assembly 705 comprises one integral piece preferably having toroidal-disk 710, two foam positioners 715 preferably surrounding shaft 720, and two snap-in locking clips 725 preferably positioned between foam positioners 715, all as shown. Preferably, each foam positioner 715 comprises recess 730 and opening 735, as shown. Preferably, snap-in locking clip 725 is complimentary to recess 730 and opening 735 such that two foam holder assemblies 705 can be snapped together at snap-in locking clip 725 (situated at opening 735), as shown in FIG. 2. Preferably, foam positioner 715 comprises barb 740 to secure either small foam 215 and/or large foam 225 to foam positioner 715, as shown and discussed more particularly with reference to FIG. 9.

Figure 8A:
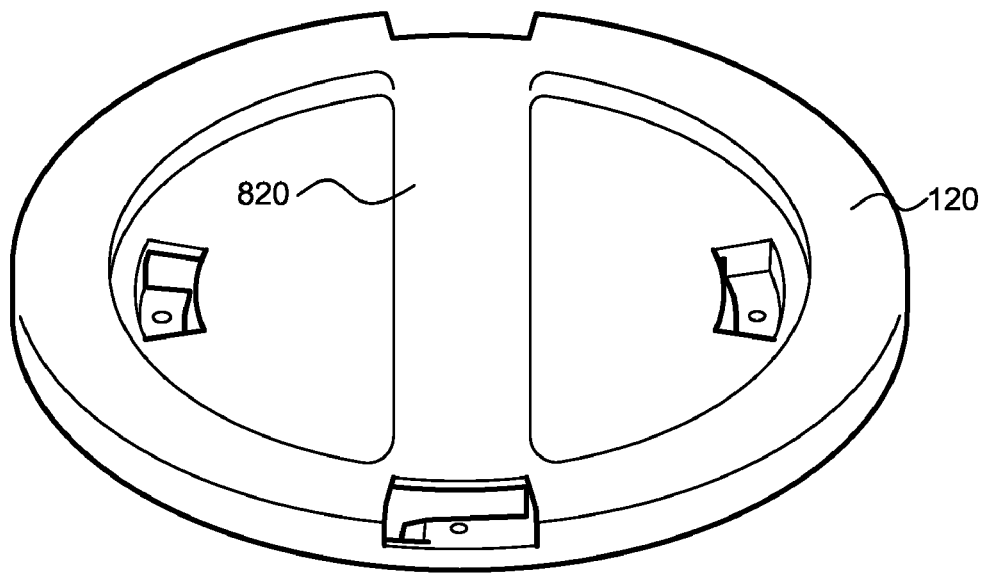
FIG. 8A shows a perspective view illustrating a cap of the chemical dispensing system according to the preferred embodiment of FIG. 1A.

FIG. 8A shows a perspective view illustrating cap 120 of chemical dispensing system 100 according to the preferred embodiment of FIG. 1A.

Figure 8B:
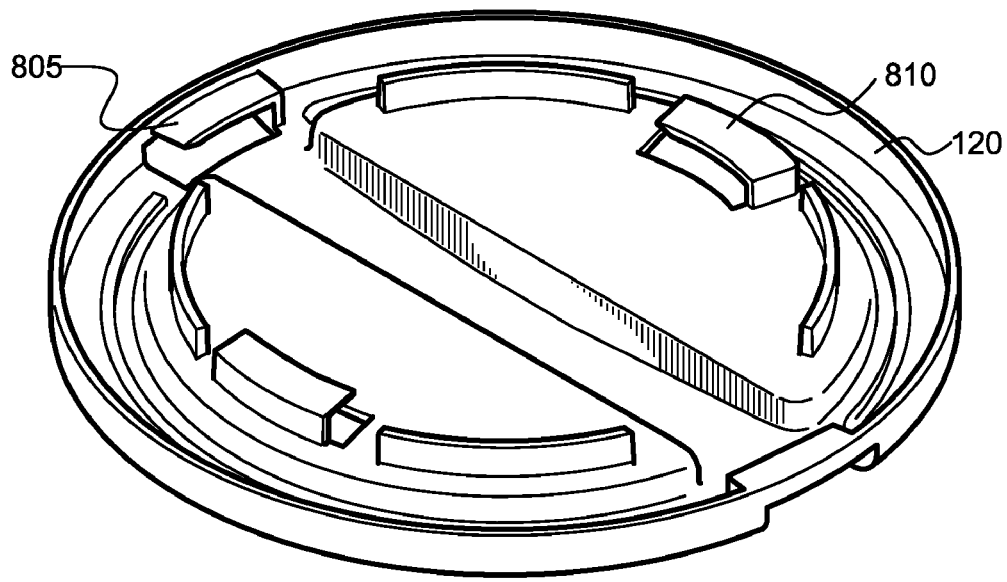
FIG. 8B shows an inverted perspective view illustrating the cap of FIG. 8A.

FIG. 8B shows an inverted perspective view illustrating cap 120 of FIG. 8A.

Preferably, cap 120 (at least embodying herein at least one cap structured and arranged to cap such at least one float adjuster) comprises outer catch 805 and inner catch 810, as shown. Preferably, cap 120 secures onto body 105 (at least embodying herein wherein such at least one cap is securely attached to such at least one holder) by rotating cap 120 clockwise or counterclockwise after lining up outer catch 805 and space 315 (as shown in FIG. 3). Preferably, cap 120 is easily rotated by grasping handle 820, as shown.

Preferably, foam holder assembly 705 secures to cap 120 (at least embodying herein wherein such at least one cap is securely attached to such at least float adjuster) by lining up notch 745 (as shown in FIG. 7B) with inner catch 810 and rotating either cap 120 or foam holder assembly 705 clockwise or counterclockwise.

Figure 9:
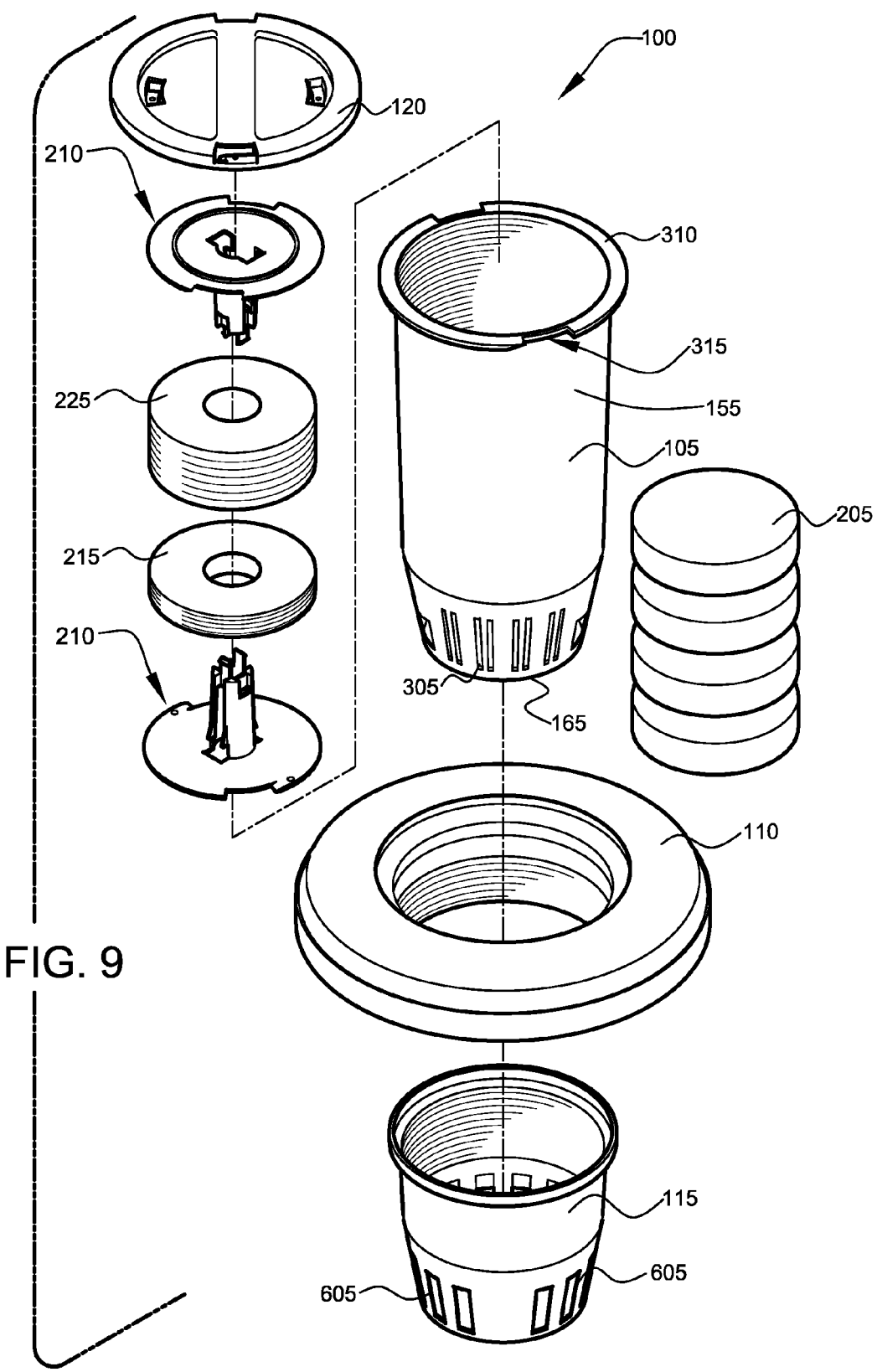
FIG. 9 shows an exploded view illustrating the chemical dispensing system according to the preferred embodiment of FIG. 1A.

FIG. 9 shows an exploded plan view illustrating chemical dispensing system 100. To assemble chemical dispensing system 100, float ring 110 preferably slips onto body 105 (at least embodying herein wherein such at least one holder may be nestably supported within such at least one floatable toroidal member), as shown. Preferably, shutter 115 slips onto body 105, as shown. Preferably, shutter 115 is secured to body 105 with a friction fit. Preferably, chemical tablets 205 are placed within body 105 (as shown in FIG. 2). Preferably, float adjuster 210 is assembled and inserted into body 105 (such arrangement at least embodying herein wherein such at least one float adjuster is removably insertable into such at least one holder), as shown. Preferably, cap 120 is secured to foam holder assembly 705, as shown. Preferably, cap 120 comprising foam holder assembly 705, secures to body 105, as shown.

Preferably, float adjuster 210 is assembled by placing small foam float 215 onto foam holder assembly 705, as shown. Preferably, large foam float 225 is placed onto foam holder assembly 705, as shown. Preferably, foam holder assembly 705 comprising small foam float 215 and foam holder assembly 705 comprising large foam float 225 are connected together by way of snap-in locking clip and opening, as described above and shown with respect to FIGS. 7A and 7B.

When chemical dispensing system 100 containing chemical tablets 205 is placed in water 150 and shutter 115 is open, chemical tablets 205 will dissolve and disperse into water 150, as shown in FIG. 1A. When first placed in water 150, preferably, top portion 355 (at least embodying herein wherein such at least one holder comprises at least one holder upper end) of body 105 (also preferred, cap 120) will be substantially flush with top portion of float ring 110, as shown, for example, in FIG. 1A (such arrangement at least embodying herein wherein such at least one upright restricter comprises at least one upright-restricter-top portion and at least one upright-restricter-bottom portion; prior to chemical depletion, such at least one holder upper end is substantially flush with such at least one upright-restricter-top portion). As chemical tablet(s) 205 dissolve and chemical disperses, body 105 will float higher within float ring 110, as shown in FIG. 1B (such arrangement at least embodying herein wherein such at least one chemical-depletion indicator indicates chemical depletion when such at least one chemical depletion indicator protrudes above such at least one upright-restricter-top portion). When body 105 is visible above float ring 110, a user may determine that body 105 may need addition of chemical tablets 205 to maintain the condition of a water-filled structure. Preferably, color 170 is visible above color 175 to signal a user, as shown (at least embodying herein wherein such at least one holder comprises at least one exterior; and such at least one chemical-depletion indicator comprises at least one first color encircling such at least one exterior; wherein such at least one band of color is visible when such at least one chemical depletion indicator protrudes above such at least one upright-restricter-top portion; and such arrangement at least embodying herein wherein such at least one upright restricter comprises at least one second color; and wherein such chemical depletion indicator indicates chemical depletion by at least one visible color difference). Preferably, chemical depletion indicator 155 (at least embodying herein at least one chemical-depletion indicator structured and arranged to visually indicate above such at least one water surface to at least one user chemical-depletion of such at least one at least partially-soluble chemical) is visible prior to full depletion of chemical tablets 205 initially inserted by user so user may add chemical tablets 205 (at least embodying herein at least partially-soluble chemical) to chemical dispensing system 100 so that the amount of chemical dispensed in water remains constant (at least embodying herein wherein such chemical-depletion indicator performs such visual indication prior to complete depletion of any of such at least two user-selected amounts of such at least one at least partially-soluble chemical).

FIG. 10 shows a close up plan view illustrating float adjuster 210 of chemical dispensing system 100 according to the preferred embodiment of FIG. 1A with small foam 215 at a bottom end, configuration D.

FIG. 11 shows a close up plan view illustrating float adjuster 210 of chemical dispensing system 100 according to the preferred embodiment of FIG. 1A having large foam float 225 at a bottom end, configuration E. Preferably, a user initially sets up chemical dispensing system 100 by selecting either configuration D or configuration E and inserting such selected configuration into body 105, as shown. A user selects a preferred position of large foam 225 relative to small foam 215 (such arrangement at least embodying herein wherein such at least one float adjuster is structured and arranged to adjust such at least one float-assister relative to any of such at least two user-selected amounts of such at least one at least partially-soluble chemical). Because a user may desire different amounts of chemical dispensed into water depending on the external environment, a user preferably selects either configuration D or configuration E of float adjuster 210, as shown.

Preferably, in low microorganism-growth conditions, configuration D is preferred. In low microorganism-growth conditions, such as, for example, the winter season, a reduced amount of chemical in water 150 of water-filled structures is needed. Preferably, in high microorganism growth conditions, configuration E is preferred. In high microorganism growth conditions an increased amount of chemical is needed. Preferably, a user places less chemical in chemical dispensing system 100 in low microorganism growth conditions and more chemical in high microorganism growth conditions. By adjusting both the amount of chemical in chemical dispensing system 100 and the configuration of float adjuster 210, indicator 155 will become visible when chemical dispensing system 100 needs chemical replenished. Further, in either configuration (configuration D or configuration E) indicator 155 will signal user at a time when chemical needs replenishing (such arrangement at least embodying herein wherein such at least one float-adjuster is structured and arranged to compensate for such selection of such at least one of such at least two user-selected amounts of at least one at least partially-soluble chemical so as to preserve similar such visual indication when any of such at least two user-selected amounts may be used).

Regarding configuration D, small foam 215 displaces less water relative to large foam 225 (shown above water 150). Thus, for visual indicator 155 to work, less chemical must be dissolved in water 150 for indicator 155 to be visible above float ring. Regarding configuration E, large foam 225 displaces more water relative to small foam 215 (shown above water 150). If more chemical is placed in body 105 (at least embodying herein at least one holder structured and arranged to hold at least one of at least two user-selected amounts of at least one at least partially-soluble chemical) with float adjuster comprising configuration E, more chemical must dissolve for indicator to be visible above float ring 110. When a user desires to change the amount of chemical placed in body 105 while still retaining optimum performance of chemical dispensing system 100 (at least embodying herein a chemical dispensing system relating to dispensing at least one at least partially-soluble chemical into at least one water-filled structure), a user may preferably remove float adjuster 210 and change configuration D to configuration E, or vice versa, and reinsert float adjuster 210 into body 105, as shown. Upon reading the teachings of this specification, those of ordinary skill in the art will now understand that, considering issues such as cost, engineering factors, etc., other ways of interchanging between and/or among configurations, such as, for example, electronically controlled gear mechanisms for rotating float adjuster, temperature dependent gear mechanisms for rotating float adjuster, etc., may suffice.

Preferably, chemical dispensing system 100 comprises a method of dispensing chemical into a water-filled structure. The method preferably comprises the steps of providing at least one chemical dispensing system as described above; placing such at least one user selected amount of chemical tablets 205 into body 105; selecting between such at least one user selected geometry of such at least one float-adjuster to use in at least one low-microorganism growth period (preferably winter), by preferably selecting configuration D, and at least one user selected geometry in at least one high microorganism growth period (preferably summer), by preferably selecting configuration E; placing such at least one chemical dispensing system in such at least one water-filled structure; viewing such at least one chemical depletion indicator; and replacing chemical tablets 205 within body 105. After replacing chemical tablets 205 within body 105, a user will select an opposite user selected geometry of float-adjuster 210; setting shutter 115, to at least one user-desired setting; placing chemical dispensing system 100 in at least one water-filled structure; viewing indicator 155; and replacing chemical tablets 205 within body 105.

Although applicant has described applicant's preferred embodiments of this invention, it will be understood that the broadest scope of this invention includes modifications such as diverse shapes, sizes, and materials. Such scope is limited only by the below claims as read in connection with the above specification.

Further, many other advantages of applicant's invention will be apparent to those skilled in the art from the above descriptions and the below claims.

What is claimed is:

1. A chemical dispensing system for dispensing a dissolving chemical into a surrounding body of water, comprising:

a buoyant float;

a chemical containing and dispensing body having a buoyancy and coupled to the float, the buoyancy of the body permitting the body to buoyantly displace relative to the float between a first position toward the float and a second position away from the float;

the body holding a dissolving chemical;

the float to hold the body holding the dissolving chemical in the body of water;

the buoyancy of the body causing the body to buoyantly displace between the first and second positions thereof relative to the float in response to a depletion of the dissolving chemical into the body of water from the body; and an indicator carried by the body, the indicator concealed by the float in the first position of the body, and exposed relative to the float in the second position of the body.

2. A chemical dispensing system according to claim 1, wherein the indicator is a color applied to the body.

3. A chemical dispensing system according to claim 1, wherein the body is encircled by the float.

4. A chemical dispensing system for dispensing a dissolving chemical into a surrounding body of water, comprising:

a buoyant float ring;

a chemical containing and dispensing body having a buoyancy and encircled by and nested within the float ring, the buoyancy of the body permitting the body to buoyantly displace relative to the float ring between a first position toward the float ring and a second position away from the float ring;

the body holding a dissolving chemical;

the float ring to hold the body holding the dissolving chemical in the body of water; and the buoyancy of the body causing the body to buoyantly displace between the first and second positions thereof relative to the float ring in response to a depletion of the dissolving chemical into the body of water from the body.

5. A chemical dispensing system according to claim 4, further comprising an indicator carried by and encircling the chemical-containing body, the indicator encircled and concealed by the float ring in the first position of the chemical-containing body, and exposed relative to the buoyant float ring in the second position of the chemical-containing body.

6. A chemical dispensing system according to claim 5, wherein the indicator is a color applied to and encircling the body.

\* \* \* \* \*